United States Patent [19]
Kosche et al.

[11] Patent Number: 5,937,187
[45] Date of Patent: Aug. 10, 1999

[54] METHOD AND APPARATUS FOR EXECUTION AND PREEMPTION CONTROL OF COMPUTER PROCESS ENTITIES

[75] Inventors: Nicolai Kosche, San Francisco; Dave Singleton, Cupertino; Bart Smaalders, San Jose; Andrew Tucker, Los Altos, all of Calif.

[73] Assignee: Sun Microsystems, Inc., Mountain View, Calif.

[21] Appl. No.: 08/675,236

[22] Filed: Jul. 1, 1996

[51] Int. Cl.$^6$ .................................................. G06F 9/00
[52] U.S. Cl. ............................................. 395/674; 395/672
[58] Field of Search .................................... 395/670, 672, 395/674, 678, 570, 671

[56] References Cited

U.S. PATENT DOCUMENTS

| | | | |
|---|---|---|---|
| 5,274,809 | 12/1993 | Iwasaki et al. | 395/674 |
| 5,515,538 | 5/1996 | Kleiman | 395/733 |
| 5,666,523 | 9/1997 | D'Souza | 395/570 |
| 5,701,432 | 12/1997 | Wong et al. | 395/457 |
| 5,720,018 | 2/1998 | Muller et al. | 395/133 |
| 5,724,503 | 3/1998 | Kleinman et al. | 395/185.1 |
| 5,754,173 | 5/1998 | Hiura et al. | 345/333 |
| 5,757,914 | 5/1998 | McManis | 380/23 |
| 5,765,151 | 6/1998 | Senator | 707/8 |
| 5,765,157 | 6/1998 | Lindholm et al. | 707/101 |
| 5,767,851 | 6/1998 | Yee et al. | 345/346 |

OTHER PUBLICATIONS

"Microprocessor and Peripheral Handbook, Vol. 1, Microprocessor", by Intel (1988), pp. 3–1 through 3–55 ("80286 High Performance Microprocessor with Memory Management and Protection").

Catanzaro, Ben, "Multiprocessor Systems Architectures: A Technical Survey of Multiprocessor/Multithreaded Systems using SPARC®, Multilevel Bus Architectures and Solaris® (SunOS™)" (1994 Sun Microsystems, Inc.) (SunSoft Press/Prentice Hall) pp. 205–228.

*Primary Examiner*—Majid A. Banankhah
*Attorney, Agent, or Firm*—Skjerven Morrill MacPherson Franklin & Friel LLP; Michael Shenker

[57] ABSTRACT

In a multiprocessing computer system, a schedulable process entity (such as a UNIX process, a Solaris lightweight process, or a Windows NT thread) sets a memory flag (sc_nopreempt) before acquiring a shared resource. This flag tells the operating system that the process entity should not be preempted. When it is time for the process entity to be preempted, but sc_nopreempt is set, the operating system sets a flag (sc_yield) to tell the process entity that the entity should surrender the CPU when the entity releases the shared resource. However, the entity is not preempted but continues to run. When the entity releases the shared resource, the entity checks the sc_yield flag. If the flag is set, the entity makes an OS call to surrender the CPU.

68 Claims, 1 Drawing Sheet

METHOD AND APPARATUS FOR EXECUTION AND PREEMPTION CONTROL OF COMPUTER PROCESS ENTITIES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to computers, and more particularly to execution and preemption of schedulable computer process entities. Examples of schedulable process entities include UNIX® processes and Solaris® lightweight processes (LWP).

A multiprocessing computer system may include resources shared by different schedulable process entities. In some cases, a shared resource can be accessed only by a limited number of such entities at a time. Thus, some DBMS latches can be held only by one process at a time. If a process holds a shared resource, other processes wishing to access the resource have to wait until the holding process releases the resource. If the holding process is preempted before releasing the resource, the waiting processes cannot run, and the system throughput becomes decreased.

It is desirable to provide preemption control methods and systems that would increase the system throughput.

SUMMARY

The present invention provides preemption control methods and systems. In some embodiments, before acquiring a shared resource, a process entity sets a memory flag (sc_nopreempt). This flag tells a scheduling program (e.g., an operating system) that the process entity should not be preempted. When it is time for the process entity to be preempted, but sc_nopreempt is set, the scheduling program sets another flag (sc_yield) to tell the process entity that the entity should surrender the CPU when the entity releases the shared resource. However, the entity is not preempted but continues to run. When the entity releases the shared resource, the entity checks the sc_yield flag. If the flag is set, the entity surrenders the CPU. In some embodiments, the entity surrenders the CPU by making an operating system call without waiting for any other event (e.g. an interrupt) to cause rescheduling of schedulable entities.

Other features and advantages of the invention are described below. The invention is defined by the appended claims.

DESCRIPTION OF PREFERRED EMBODIMENTS

Figure 1:
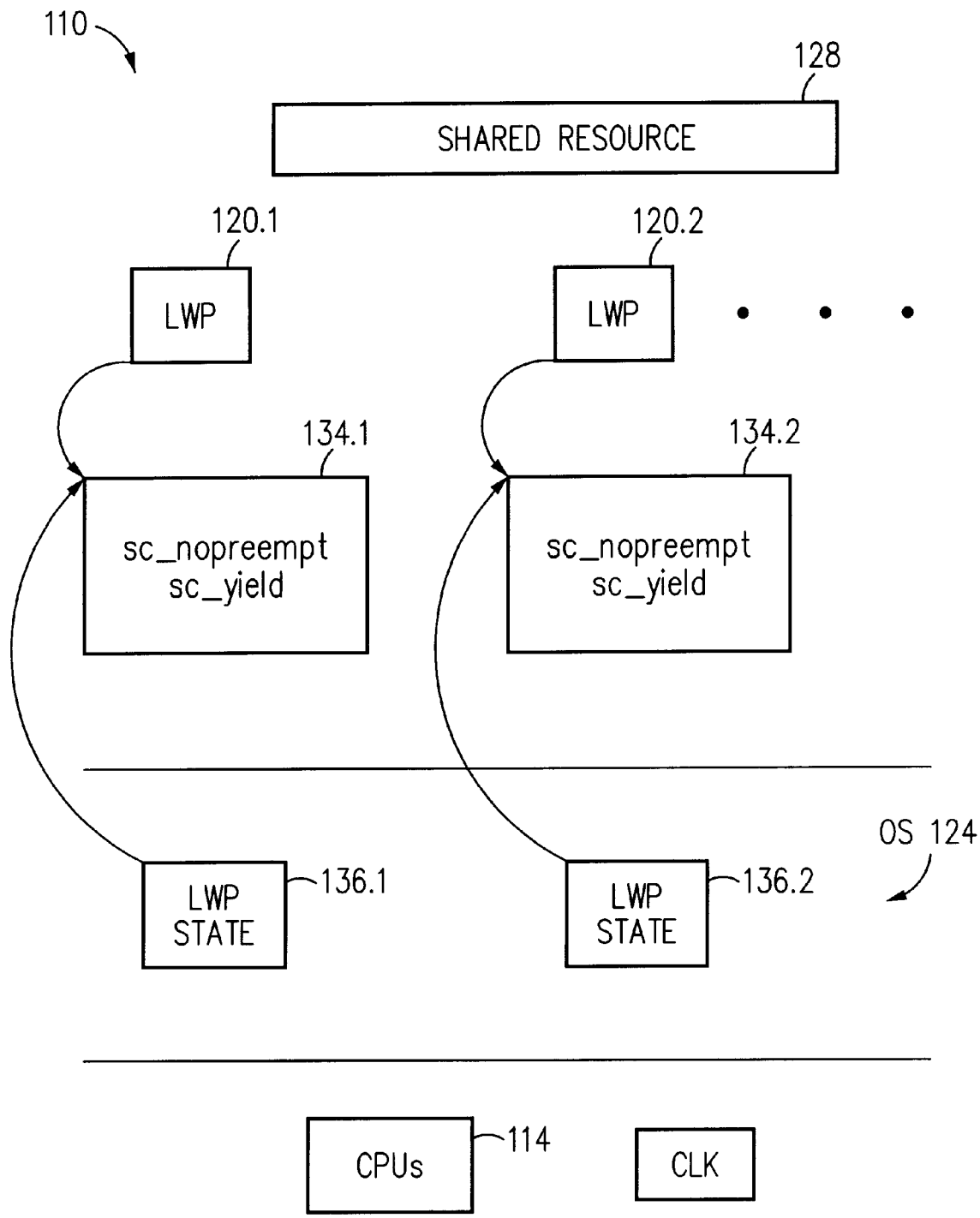
FIG. 1 is a block diagram of a computer system that implements preemption according to the present invention.

FIG. 1 is a block diagram of computer system 110. One or more CPU's 114 execute a number of schedulable computer process entities 120.1, 120.2, and possibly other process entities. Operating system (OS) 124 schedules entities 120.i for execution. In some embodiments, OS 124 is a Solaris® operating system, and each entity 120.i is a Solaris process or an LWP (lightweight process) executing a thread. Solaris is described, for example, in B. Catanzaro, "Multiprocessor System Architectures" (Sun Microsystems, Inc. 1994) hereby incorporated herein by reference. In some embodiments, OS 124 is a UNIX® operating system, and each process entity 120.i is a UNIX process. In some embodiments, OS 124 is Windows NT (Trademark), and each entity 120.i is a thread.

FIG. 1 illustrates a preemption control method available in system 110. Appendix 1 shows preemption control code executed by entities 120.i in a Solaris embodiment. Appendix 2 shows preemption control code executed by OS 124 in a Solaris embodiment. Appendices 1 and 2 are written in C-like pseudocode.

In FIG. 1, entities 120.1, 120.2 share a resource 128. In some embodiments, this resource is a DBMS latch (a short-lived shared resource in a DBMS). In some embodiments, resource 128 is a non-DBMS resource. In some embodiments, resource 128 is data, code, or a hardware device, for example, a modem. Before attempting to acquire the resource, entity 120.1 calls OS 124 to allocate a memory 134.1 (see the OS call schedctl_init( ) in Appendix 1, line 14). Memory 134.1 will store variables sc_nopreempt and sc_yield used for preemption control. In addition, memory 134.1 stores a flag (not shown) indicating that the memory has been allocated for preemption control. Some embodiments of system 110 use virtual memory, and the memory locations sc_nopreempt and sc_yield are in the address space of entity 120.1 (are "visible" to entity 120.1). In some embodiments, the flag indicating that the memory has been allocated for preemption control is not visible to entity 120.1 but the entire memory 134.1 is visible to the kernel (not shown) of OS 124. The kernel keeps in memory the entity state 136.i for each entity 120.i. The OS routine allocating the memory 134.1 stores a pointer to memory 134.1 in the state 136.1 and returns the pointer to entity 120.1.

Still before attempting to acquire the resource, process entity 120.1 sets the variable sc_nopreempt (within macro schedctl_start( ) in Appendix 1, line 39). This indicates to OS 124 that the process entity 120.1 should not be preempted. Since sc_nopreempt is visible to entity 120.1, sc_nopreempt is set without making an OS call.

OS 124 periodically reschedules entities 120 for execution. In some embodiments, the rescheduling is performed on each tick of a clock CLK. Entities 120 are scheduled based on a scheduling policy. Different scheduling policies are used in different embodiments. If the scheduling policy requires entity 120.1 to be preempted, OS 124 checks the sc_nopreempt location in memory 134.1 (Appendix 2, line 10). If sc_nopreempt is set, OS 124 does not preempt the entity 120.1. However, OS 124 sets the flag sc_yield in memory 134.1 (Appendix 2, lines 22–23). This flag indicates to entity 120.1 that this entity should voluntarily surrender the CPU after releasing the resource without waiting for another event to cause entity rescheduling.

After releasing the resource, entity 120.1 resets sc_nopreempt and checks the flag sc_yield in memory 134.1 (within the macro schedctl_stop( ) in Appendix 1, line 82). If sc_yield is set, entity 120.1 makes an OS call releasing the CPU (within schedctl_stop( ) in Appendix 1, line 82). In some Solaris embodiments, the OS call is yield( ).

In some embodiments, each process entity 120.i uses separate memory 134.i to control preemption of the entity. Each memory 134.i and entity state 136.i are used as described above for the case i=1.

In some embodiments, entity 120.i reuses memory 134.i for multiple acquisitions of shared resources. Entity 120.i does not deallocate memory 134.i after a resource is released before a resource is acquired. Once memory 134.i has been allocated, no OS calls or context switches are needed to access the memory 134.i by entity 120.i or the kernel. Therefore, the preemption control of FIG. 1 is fast.

Since entity 120.i is not preempted while holding a resource, the time the entity holds the resource is reduced. Therefore, there is less possibility that another schedulable entity gets blocked waiting for the resource. Hence the system throughput is increased.

In the embodiment of Appendices 1–3, the preemption control is implemented for the Timeshare (TS) and Interactive (IA) scheduling classes only. (Solaris scheduling classes are described in "Multiprocessor System Architectures", cited above, pages 220–225, and also on-line in Solaris releases 2.5 and later. Solaris is available from Sun Microsystems, Inc. of Mountain View, Calif.) Further, sc_nopreempt does not block preemption of a TS or IA thread by a thread in a system or real time (RT) scheduling classes. Of note, threads in system and RT classes have higher priorities than threads in TS and IA classes. sc_preempt also does not block preemption by interrupt service routines executed on other than clock-tick interrupts (i.e., on interrupts not caused by clock CLK).

The preemption control of FIG. 1 helps solving the following problem for resources associated with spinlocks. If entity 120.i is in a busy loop on a spinlock waiting for another entity to release the spinlock, the waiting entity occupies a CPU and thus makes it more difficult (or impossible) for the other entity to get a CPU to run on and release the spinlock. This can be a major performance problem for DBMS servers running heavy loads.

In system 110, this problem is solved because the entity holding a spinlock is not preempted.

In some embodiments, preemption control of FIG. 1 helps to solve the priority inversion problem in which a lower-priority LWP holds a resource required by a higher priority LWP, thereby blocking that higher-priority LWP. In Solaris, if a locked object (resource) is known to the kernel, this problem is addressed by priority inheritance. The Solaris kernel maintains information about locked objects (mutexes, reader/writer locks, etc). The kernel identifies which thread (LWP) 120.i is the current owner of an object and also which thread is blocked waiting to acquire the object. When a high priority thread (LWP) blocks on a resource held by a lower priority thread, the kernel temporarily transfers the blocked thread's priority to the lower-priority thread. When this holding thread releases the resource, its priority is restored to its lower level. See "Multiprocessor System Architectures", cited above, page 227.

If the object is a "userland" resource, i.e., a resource for which the kernel does not identify holding/blocking threads, then Solaris does not implement priority inheritance for the object. For such objects, the priority inversion problem is alleviated by the preemption control of FIG. 1. When the timeshare LWP 120.i sets sc_nopreempt, the LWP priority is raised in effect to the maximum timeshare priority as the LWP may only be preempted by system and RT threads and non-clock-tick interrupts.

In some embodiments, sc_nopreempt is the only data item that is modified by the LWP. It is only modified by the macros defined in the schedctl header file schedctl.h shown in Appendix 3.

In Appendices 1–3, every LWP 120.i is allocated a time quantum. If a clock tick occurred when the LWP was running, the LWP's time quantum is decremented (Appendix 2, line 4). When the time quantum becomes 0, the LWP can be preempted. If the LWP's sc_nopreempt is set, the preemption is blocked only until the LWP has run for a predetermined amount of time (SC_MAX_TICKS) after the time quantum has become 0 (Appendix 2, line 21). After this time, the LWP is rescheduled as if its sc_preempt is not set, even if sc_nopreempt is still set.

In some embodiments, the variables sc_nopreempt, sc_yield are defined in programming language C as follows:

```
typedef struct sc_public {
    volatile short sc_nopreempt;
    volatile short sc_yield;
} sc_public_t;
typedef struct sc_public schedctl_t;
```

In Appendices 1–3, the interface to the preemption control includes the following:

(schedctl_t *)schedctl_init( )

This routine allocates memory 134.i for the calling LWP 120.i in the kernel address space. This routine calls mmap( ) to make sc_nopreempt and sc_yield visible to LWP 120.i. (mmap( ) is a UNIX call.) The routine returns a pointer ("schedctl_t pointer") to memory 134.i.

In some embodiments, if an LWP uses a schedctl_t pointer returned by a schedctl_init( ) call made by another LWP, the results of the preemption control operations are undefined. Therefore, a thread using the preemption control should be created as a bound thread (that is, bound to an LWP), i.e., the THR_BOUND flag should be set for thr_create(3T). See Appendix 1, line 94. While the schedctl_t public data (i.e., sc_nopreempt and sc_yield) is available to any thread in the process (if the data is within the thread's scope), the OS kernel associates the schedctl_t data with a specific LWP ID (via a pointer to memory 134.i in LWP state 136.i). Therefore only threads running on that LWP will be affected by the preemption control.

For example, if an unbound thread calls schedctl_init( ), runs for a time, is rescheduled on a different LWP, then later does a schedctl_start( ) (described below) to set sc_nopreempt, it is the thread currently running on the original LWP that will not be preempted, while the thread that set sc_nopreempt can be preempted.

schedctl_start(schedctl_t *)

This is a C language macro. The argument is a pointer to the thread's schedctl_t data.

The macro simply sets the sc_nopreempt flag to 'IN_CRITICAL_SECTION'(i.e. to 1). The flag is checked by the OS scheduler (which is part of the kernel) if and only if the thread is a candidate for preemption, e.g. if the thread's time quantum has become zero or the thread is about to be preempted by a system thread.

The only error checking done by the macro is to ensure that the schedctl_t pointer is not NULL. For performance reasons, no error checking is done to ensure the pointer is valid for the thread.

In some embodiments, schedctl_start( ) is called before the thread attempts to acquire the resource. This is done to prevent the kernel from preempting the thread that has acquired the resource but has not yet called this macro to set sc_nopreempt.

schedctl_stop(schedctl_t *)

This call is implemented as a C language macro to be fast. The argument is a pointer to the thread's schedctl_t data (i.e., to memory 134.i).

The macro resets the sc_nopreempt flag to zero. Then the macro checks the sc_yield flag. If this flag is set, the macro does a yield(2) system call.

The only error checking done is to ensure that the schedctl_t pointer is not NULL. For performance reasons, no error checking is done to ensure the pointer is valid for the thread.

In some embodiments, this macro is called after the thread has released the resource.

In Appendices 1 and 2, the preemption control is used in a DBMS system for threads that acquire a critical resource/latch. Latching events include acquisition and release of database latches for subsystems within the DBMS. The following latching events are possible:

atomic attempt to acquire a latch. LATCH_ATTEMPT( )

If the attempt is successful, the latch is locked. For a spinlock, this routine blocks until the latch is acquired. For a conditional lock, this routine returns either success or failure immediately. For a wait lock, this routine surrenders the CPU after each attempt, and then repeats the attempt until the latch is acquired.

voluntary CPU surrender while attempting to acquire/release a latch. LATCH_YIELD( )

latch release LATCH_RELEASE( )

This routine releases the latch without surrendering the CPU.

Appendix 1, lines 1–83, illustrates code for a thread 120.i in a single threaded Solaris process. Line 2 incorporates the file schedctl.h. At line 24, LWP 120.i determines whether the latch to be acquired is a spinlock, a conditional lock, or a wait lock. A spinlock latch is acquired as shown in lines 35–43; a conditional lock is acquired in lines 44–57; and a wait lock is acquired in lines 58–70. The macro schedctl_stop( ) is executed at line 82.

Lines 85–116 of Appendix 1 illustrate code for a thread 120.i in a multi-threaded process. Line 89 declares the thread ID variable tid. At line 92, a bound thread is created. Line 101 declares and initializes the schedctl_t pointer for the bound thread.

Lines 118–301 of Appendix 1 show code suitable for threads that may hold a number of latches simultaneously. Memory location latch_count holds the number of latches held by the thread (line 121). The thread calls schedctl_start( ) only if latch_count=0. See, for example, lines 155–156. latch_count is incremented when a latch is acquired (for example, in lines 157, 170, 185) and decremented when a latch is released (line 173). The thread calls schedctl_stop( ) only if the thread does not hold any latches (lines 173–174, 206–207).

Lines 118–208 show code for a single-threaded process. Lines 209–301 show code for a multi-threaded process.

If thread 120.i issues a system call while the thread has its sc_nopreempt flag set, the thread may be removed from the CPU and put on a dispatch queue while the thread waits for some system service, e.g., a semaphore post. This event is not considered preemption, but is considered a voluntary surrender of the CPU by the thread. Neither the thread nor the OS check or modify the thread's memory 134.i. The thread is placed on a dispatch queue according to the standard scheduler policy. The thread will be rescheduled according to the usual Solaris TS/IA scheduling. The thread's time quantum does not decrease. So effectively, the thread is exactly as it was with regard to scheduling before the system call.

An exception is the yield(2) system call. When a thread does a yield(2) call, the OS checks to see whether the yield( ) has occurred from the schedctl_stop( ) macro, i.e., the thread's time quantum was extended to block preemption (Appendix 2, line 74). If so, the TS scheduler class specific call, ts_yield( ), simulates preemption for the thread (i.e., simulates what happens when the thread's time quantum expires). See line 78.

The TS/IA class-specific clock tick processing performed by OS 124 on every clock tick interrupt (i.e., every interrupt caused by clock CLK) is illustrated in Appendix 2, lines 1–31 (routine ts_tick( )). In routine ts_tick( ), if the thread is running with a system or RT priority, the thread is not preempted (lines 2–3). Otherwise, the thread's time quantum is decremented (line 4). If the remaining time is positive, the thread is not preempted, and no preemption control is performed (lines 5–6). Otherwise, if the thread's sc_nopreempt is set (line 10), the thread will be allowed to run for a predetermined period of time (SC_MAX_TICKS). SC_MAX_TICKS is set to 5 clock ticks in some embodiments. Each tick is 10 milliseconds, and thus 5 ticks is 50 milliseconds. If sc_nopreempt is set, and the thread has run less than SC_MAX_TICKS beyond the thread's original time quantum, the kernel sets the thread's sc_yield flag (lines 22–23) and allows the thread to continue to run. If the thread has run for at least SC_MAX_TICKS after the thread's initial time quantum expired, the thread is preempted in spite of sc_nopreempt being set.

The value SC_MAX_TICKS is chosen so that most threads 120.i in the computer system will not hold a resource for longer than SC_MAX_TICKS. If the thread holds a resource for more than SC_MAX_TICKS, the thread can be preempted in order not to degrade throughput of other threads 120.i. See Appendix 2, lines 21 and 25–29. In this case, the thread's schedctl_t data (memory 134.i) is unchanged so that when the thread is rescheduled on a CPU, the sc_nopreempt will still be set and sc_yield will be off. (sc_yield is reset on every yield( )—see Appendix 2, lines 70–72.)

On an interrupt other than a clock tick, or on a kernel trap, the preemption control is performed by the routine ts_preempt( ) in Appendix 2, lines 32–68. In ts_preempt( ), "curthread" is the thread that was running when the interrupt or kernel trap occurred. In this case thread 120.i is preempted even if its sc_nopreempt is set. To minimize the performance impact of the preemption on the thread, the thread is put on the front of the highest priority queue so that the thread will be rescheduled to run on a CPU with the minimum possible delay (Appendix 2, line 63). Thus, the preempted thread 120.i gets at least as high a priority as all other TS and IA threads 120.i.

If the thread has blocked preemption for more than SC_MAX_TICKS, the thread is treated as if it has not used preemption control. See Appendix 2, lines 45–54 and 64–66.

If a TS or IA thread had preemption blocked via sc_nopreempt and the thread's time quantum has expired, or if the thread was preempted by a system thread or trap, sc_yield will have been set by the kernel (Appendix 2, line 60).

The yield(2) system call trap is handled by the OS routine ts_yield( ) shown in Appendix 2, lines 69–82.

ts_yield( ) resets sc_yield if memory 134.i has been initialized (lines 70–72). If the thread's time quantum is negative, the thread has its time slice artificially extended to block preemption. In this case, ts_yield( ) simulates preemption. In particular, the thread priority is recalculated (line 78). In some embodiments, the thread is given lower priority than when the thread is preempted.

Line 80 and 81 are executed for any yield( ) call. At line 80,the thread time quantum values are reset (there are a number of quantum values for different possible priorities). In line 81, ts_yield( ) puts the thread on the appropriate dispatch queue.

The following provides additional information on the application programming interface (API) to the preemption control of some embodiments of FIG. 1.

The API routines can be declared in C as follows:

```
#include <schedctl.h>
schedctl_t *schedctl_init(void);
schedctl_t *schedctl_lookup(void);
void schedctl_exit(void);
void schedctl_start(schedctl_t *ptr);
void schedctl_stop(schedctl_t *ptr);
```

If schedctl_init( ) is called more than once by the same LWP, the most recently returned pointer to memory 134.i is the only valid one. schedctl_init( ) returns a pointer to a schedctl_t structure if the routine was successful, or NULL otherwise.

schedctl_lookup( ) returns a pointer to the currently allocated memory 134.i for the calling LWP. The same pointer was previously returned by schedctl_init( ) . This can be useful in programs where it is difficult to maintain the local state for each LWP. If memory 134.i for the calling LWP is not found, schedctl_lookup( ) returns NULL.

schedctl_exit( ) deallocates the memory 134.i for the calling LWP.

In some embodiments, schedctl_start( ) and schedctl_stop( ) bracket short critical sections.

In some embodiments, if the preemption control is used by LWPs in scheduling classes other than TS and IA, such as real-time (RT), no errors will be returned but schedctl_start( ) and schedctl_stop( ) will not have any effect.

In some embodiments, if a process containing LWPs using preemption control performs a fork(2), and the child does not immediately call exec(2), then each LWP in the child must call schedctl_init( ) again prior to any future uses of schedctl_start( ) and schedctl_stop( ).

In some multi-CPU embodiments, when one CPU (for example, CPU 1) executes the kernel, the kernel may wish to preempt an LWP (e.g., LWP 120.2) running on a different CPU (say, CPU 2) to schedule another, higher priority LWP on CPU 2. Before preempting LWP 120.2, the kernel checks the LWP's sc_nopreempt flag. If the flag is reset, the kernel preempts LWP 120.2. However, before LWP 120.2 is preempted, the LWP may set its sc_nopreempt and acquire a shared resource. The preemption control will therefore fail due to the race between the kernel and LWP 120.2.

Therefore, in some embodiments, while an LWP 120.2 runs on a CPU 2, the other CPU's do not access the LWP's memory 134.2. If the kernel runs on CPU 1 and decides that the LWP on CPU 2 should be preempted, the kernel sends an interrupt to CPU 2. Then CPU 2 starts running the kernel and preempts the LWP.

The embodiments described above illustrate but do not limit the invention. The invention is not limited by any particular operating system, the number of CPUs, a particular programming language, or particular hardware. The invention is not limited by the order in which an entity 120.i sets sc_nopreempt and acquires a shared resource, or by the order in which an entity 120.i releases the resource and checks sc_yield. In some embodiments, SC_MAX_TICKS is not a fixed interval of time but is a function of the system load, the number of times the thread has held a resource for a long time, the frequency of the thread having held a resource for a long time, and/or other parameters. Other embodiments and variations are within the scope of the invention, as defined by the appended claims.

APPENDIX 1

1  Non-multi-threaded process

```
2   #include <schedctl.h>
3   schedctl_t *sc_p;      /* create global schedctl_t
4   pointer*/
5   main(int argc, char **argv)
6   {
7       ...
8       do_dbms_processing();
9       ...
10      exit(0);
11  }
12    do_dbms_processing()
13  {
14      sc_p = schedctl_init();
15      for(;;)[
16         ...
17         get_latch(latch);
18         .....   /* processing*/
19         release_latch(latch);
20      }
21  }
22  get_latch(latch_t latch)
23  {
24      latch_type = get_latch_type(latch);
25      switch(latch_type){

26         /*
27         NB. In all cases below, the thread will set the
28         sc_nopreempt flag BEFORE the latch is actually
29         acquired/locked. This is to remove the
30         possibility of a race condition whereby the
31         thread is preempted by the OS after the latch
32         is acquired but before the schedctl_start()
33         macro is executed.
```

```
34        */
35      case SPINLOCK:
36        /* A spinlock will have the following sequence:
37            attempt/lock - release
38        */
39        schedctl_start(sc_p);
40        LATCH_ATTEMPT(latch);
41        /* latch is now acquired/locked and LWP is in
42        critical section */
43        break;
44    case CONDLOCK:
45        /* conditional lock will have the following
46        sequence:
47        attempt - acquire - release     OR
48        attempt              */

49    schedctl_start(sc_p);
50    if(LATCH_ATTEMPT(latch) != SUCCESS){
51      /* Can't lock the conditional latch */
52      schedctl_stop(sc_p);
53      return(FAILURE);
54      }

55      /* latch is now acquired/locked and LWP is in
56      critical section */
57      break;
58    case WAITLOCK:
59      /* wait lock will have the following sequence :
60         attempt - [yield, attempt]* - release   */
61      schedctl_start(sc_p);
62      while(LATCH_ATTEMPT(latch) != SUCCESS){
63        schedctl_stop(sc_p);
64        LATCH_YIELD();   /* surrender CPU to allow the
65        latch to be released by the holding LWP   */
66        schedctl_start(sc_p);
67      }
```

-17-                    APPENDIX 1

```
68          /* latch is now acquired/locked and LWP is in
69          critical section */
70          break;
71      }
72      return(SUCCESS);
73  }

74  release_lalch(latch_t latch)
75  {
76      /* NB. sc_nopreempt is not reset until AFTER
77         the latch is released to avoid race
78         conditions/yield() calls while holding the
79         latch
80      */
81      LATCH_RELEASE(latch);
82      schedctl_stop(sc_p);
83  }

84  Multi-threaded process
85  #include <thread.h>
86  #include <schedctl.h>
87  main(int argc, char **argv)
88  {
89      thread_t tid;
90      ...
91      /* create a BOUND thread */
92      thr_create(NULL, 0, (void *(*)(void
93  *))do_dbms_processing, (void *)NULL,
94          (THR_BOUND | THR_NEW_LWP ), &tid);
95      ...
96      exit(0);
97  }
98  do_dbms_processing()
99  {
100     /* NB. Each thread has its own schedctl_t data */
```

```
101      schedctl_t *sc_p = schedctl_init();
102      .for(;;) [
103         ...
104         get_latch(sc_p, latch);
105         .....                    /* processing */
106         release_latch(sc_p, latch);
107      }
108  }
109  get_latch(schedctl_t *sc_p, latch_t latch)
110  {
111      /* as above */
112  }
113  release_latch(schedctl_t *sc_p, latch_t latch)
114  {
115      /* as above */
116  }

117  Non-multi-threaded process, multiple làtches
118  #include <schedctl.h>
119  schedctl_t  *sc_p;    /* create global schedctl_t
120  pointer */
121  int latch_count = 0;  /* number of latches acquired */
122  main(int argc, char **argv)
123  {
124    ...
125    do_dbms_processing();
126    ...
127    exit(0);
128  }
129  do_dbms_processing()
130  {
131    sc_p = schedctl_init();
132    for(;;) [
133       ...
134       get_latch(latch);
135       .....    /* processing */
```

APPENDIX 1

```
136            release_latch(latch);
137        }
138    }
139    get_latch(latch_t)
140    {
141        latch_type = get_latch_type(latch);
142        switch(latch_type){

143           /* NB. In all cases below, the thread will set
144              the sc_nopreempt flag BEFORE the latch is
145              actually acquired/locked. This is to remove the
146              possibility of a race condition whereby the
147              thread is preempted by the OS after the latch
148              is acquired but before the schedctl_start()
149              macro is executed.
150           */
151           case SPINLOCK:
152             /* A spinlock will have the following sequence:
153                attempt/lock - release
154             */
155             if(latch_count == 0)
156               schedctl_start(sc_p);
157             latch_count++;
158             LATCH_ATTEMPT(latch);
159             /* latch is now acquired/locked and LWP is in
160             critical section */
161             break;
162           case CONDLOCK:
163             /* conditional lock will have the following
164             sequence:-
165                attempt - acquire - release     OR
166                attempt
167             */
168             if(latch_count == 0)
169               schedctl_start(sc_p);
170             latch_count++;
```

```
171         if(LATCH_ATTEMPT(latch) != SUCCESS){
172            /*Can't lock the conditional latch */
173            if(--latch_count == 0)
174               schedctl_stop(sc_p);
175            return(FAILURE):
176         }
177         /* latch is now acquired/locked and LWP is in
178            critical section */
179         break;
180      case WAITLOCK:
181         /*wait lock will have the following sequence:
182            attempt - [yield, attempt]*- release  */
183         if(latch_count == 0)
184            schedctl_start(sc_p);
185         latch_count++;
186         while(LATCH_ATTEMPT(latch) != SUCCESS){
187            if(latch_count==1) schedctl_stop(sc_p);
188            LATCH_YIELD(); /* surrender CPU to allow the
189               latch to be released by the holding LWP */
190            if(latch_count==1) schedctl_start(sc_p);
191         }
192         /* latch is now acquired/locked and LWP is in
193            critical section */
194         break;
195      }
196      return(SUCCESS);
197   }
198   release_latch(latch_t latch)
199   {
200      /* NB.  The sc_nopreempt flag is not reset until
201               AFTER the latch is released to avoid race
202               conditions/yield() calls while holding the
203               latch
204      */
205      LATCH_RELEASE(latch);
206      if(--latch_count == 0)
```

```
207         schedctl_stop(sc_p);
208     }

209     Multithreaded process, multiple latches
210     #include<schedctl.h>
211     #include<thread.h>
212     main(int argc, char **argv)
213     {
214       ...
215       do_dbms_processing();
216       ...
217       exit(0);
218     }
219     do_dbms_processing()
220     {
221       int latch_count=0; /*number of latches acquired*/
222       schedctl_t    *sc_p=schedctl_init();
223       for(;;){
224          ....
225          get_latch(sc_p,latch,&latch_count);
226          ..... /*processing*/
227          release_latch(sc_p,latch,&latch_count);
228       }
229     }
230     get_latch(schedctl_t*sc_p,latch_t latch,int
231     *latch_count)
232     {
233       latch_type = get_latch_type(latch);
234       switch(latch_type){

235       /*NB. In all cases below, the thread will set the
236          sc_nopreempt flag BEFORE the latch is actually
237          acquired/locked.  This is to remove the
238          possibility of a race condition whereby the
239          thread is preempted by the OS after the latch
240          is acquired but before the schedctl_start()
```

```
241            macro is executed.
242          */
243        case SPINLOCK:
244          /*A spinlock will have the following sequence:-
245            attempt/lock - release
246          */
247          if(*latch_count == 0)
248            schedctl_start(sc_p);
249          *latch_count++;
250          LATCH_ATTEMPT(latch);
251          /*latch is now acquired/locked and LWP is in
252          critical section*/
253          break;
254        case CONDLOCK:
255          /*conditional lock will have the following
256          sequence:
257            attempt - acquire - release    OR
258            attempt
259          */
260          if(*latch_count==0)
261            schedctl_start(sc_p);
262          *latch_count++;
263          if(LATCH_ATTEMPT(latch) != SUCCESS){
264            /* Can't lock the conditional latch */
265            if(--*latch_count == 0)
266              schedctl_stop(sc_p);
267            return(FAILURE);
268          }
269          /*latch is now acquired/locked and LWP is in
270          critical section*/
271          break;
272        case WAITLOCK:
273          /* wait lock will have the following sequence :
274            attempt - [yield, attempt]* - release */
275          if(*latch_count == 0)
276            schedctl_start(sc_p);
```

```
277           *latch_count++;
278           while(LATCH_ATTEMPT(latch) !=SUCCESS){
279             if(--*latch_count==0)  schedctl_stop(sc_p);
280             *latch_count++;
281             LATCH_YIELD();  /*surrender CPU to allow the
282                     latch to be released by holding LWP*/
283             if(*latch_count==0)  schedctl_start(sc_p);
284           }
285           /*latch is now acquired/locked and LWP is in
286           critical section*/
287           break;
288        }
289        return(SUCCESS);
290    }

291    release_latch(latch_t latch, int *latch_count)
292    {
293        /*NB. The sc_nopreempt flag is not reset until
294              AFTER    the latch is released to avoid race
295              conditions/yield() calls while holding the
296              latch
297        */
298        LATCH_RELEASE(latch);
299        if(--*latch_count == 0)
300          schedctl_stop(sc_p);
301    }
```

APPENDIX 2

```
1   ts_tick(active_thread){
2     if(active_thread running with system or RT priority)
3       return; /* No action - thread continues to run */
4     decrement active_thread time quantum
5     if(active_thread time quantum>0)
6       return; /* No action - thread continues to run */
7     else {    /* Thread time quantum expired*/
8       if(active_thread has schedctl_t initialized) &&
9                         /*by schedctl_init()*/
10         (schedctl_t sc_nopreempt flag set) &&
11                         /*by schedctl_start()*/
12         /*Check that the thread has blocked preemption
13             for a maximum of SC_MAX_TICKS ticks.  This is
14             set to 5 ticks, ie, a thread can only block
15             preemption for 50 milliseconds beyond the end
16             of the allocated time quantum for the
17             thread's scheduler priority.  This is to
18             ensure that no process can block preemption
19             indefinitely and degrade overall system
20             performance. */
21        (active_thread time quantum>-SC_MAX_TICKS){
22          schedctl_set_yield(active_thread); /*Set the
23                    sc_yield flag for this thread*/
24          return;   /*Thread continues to run on CPU*/
25        } else {
26          /*standard TS/IA tick processing*/
27          set new thread priority for active_thread,
28          put active_thread on relevant dispatch queue
29          return;
30       }
31   }
32   ts_preempt(){
33     if(preempted in the kernel){
34       set curthread priority to system class priority;
35       set 'trap return' flag on;
```

```
36      }
37      if(preempted in userland){
38         set curthread swappable; /*Possible because no
39         kernel locks held*/
40      }
41      if(curthread has schedctl_t initialized)&&
42                    /* by schedctl_init()*/
43         (schedctl_t sc_nopreempt flag set)&&
44                    /*by schedctl_start()*/
45           /*Check that the thread has blocked preemption
46              for a maximum of SC_MAX_TICKS ticks.  This is
47              set to 5 ticks, ie, a thread can
48              only block preemption for 50 milliseconds
49              beyond the end of the allocated time quantum
50              for the thread's scheduler priority.
51              This is to ensure that no process can block
52              preemption indefinitely and degrade overall
53              system performance. */
54          (curthread time quantum>-SC_MAX_TICKS){
55            if(curthread NOT preempted in kernel){/*No
56            system class priority */
57            set curthread priority to maximum TS priority;
58            /* priority ==59*/
59            mark thread NOT swappable;
60            schedctl_set_yield(active_thread);
61                 /*Set the sc_yield flag*/
62            {
63            put curthread on FRONT of dispatch queue;
64         }else{  /*Standard TS/IA preemption processing*/
65            reset curthread time quantum;
66            put on dispatch queue;
67         }
68      }

69   ts_yield(thread){
70      if(thread has schedctl_t initialized){
```

```
71                                    /*by schedctl_init()*/
72       set sc_yield flag OFF;
73     }
74     if(thread time quantum<0){
75            /*This thread had its timeslice artificially
76            extended to avoid preemption, so simulate
77            preemption now*/
78       recalculate thread priority;
79     }
80     reset thread time quantum values;
81     put on back of dispatch queue;
82  }
```

APPENDIX 3

```
1    /* schedctl.h
2    /*     Copyright (c) 1995, by Sun Microsystems, Inc.
3     */
4    /*     THIS IS UNPUBLISHED PROPRIETARY SOURCE CODE OF
5    SMI   */
6    /*     The copyright notice above does not evidence any
7    /*     actual or intended publication of such source
8    code. */
9    #ifndef _SCHEDCTL_H
10   #define _SCHEDCTL_H
11   #pragma ident "@(#)schedctl.h   1.1   96/04/17 SMI"
12   #ifdef_cplusplus
13   extern "C"{
14   #endif
15   #include <sys/schedctl.h>
16   typedef struct sc_public schedctl_t;
17   #define schedctl_start(p)\
18          {/
19              if (p!=NULL) {\
20                  ((schedctl_t*)(p))->sc_nopreempt == 1;\
21              }\
22          }
23   #define schedctl_stop(p)\
24          {/
25              if(p !=NULL) {\
26                  ((schedctl_t*)(p))->sc_nopreempt = 0;\
27                  if (((schedctl_t*)(p))->sc_yield == 1) {\
28                      ((schedctl_t*)(p))->sc_yield = 0; \
29                      yield(); \
30                  }\
31              }\
32          }
33   /*
34    * libsched API
```

```
35   */
36   #if   defined(_STDC_)
37   schedctl_t *schedctl_init(void);
38   schedctl_t *schedctl_lookup(void);
39   void       schedctl_exit(void);
40   #else
41   schedctl_t *schedctl_init();
42   schedctl_t *schedctl_lookup();
43   void       schedctl_exit();
44   #endif  /*_STDC_*/
45   #ifdef_cplusplus
46   }
47   #endif
48   //endif /*_SCHEDCT_H*/
```

We claim:

1. A method for operating a computer, the method comprising:
   a schedulable computer process entity E1 running on the computer and requesting not to be preempted by a scheduling operation when the scheduling operation schedules computer process entities to run, wherein preemption of a schedulable process entity comprises preventing the entity from running even through the entity is able to run and is not voluntarily surrendering a computer processor;
   the computer process entity E1 continuing to run after requesting not to be preempted;
   the computer process entity E1 checking if the computer process entity E1 has been requested to surrender a processor, and if the computer process entity E1 has been requested to surrender the processor then the computer process entity E1 voluntarily surrendering the processor.

2. The method of claim 1 wherein requesting not to be preempted comprises writing to a memory location in an address space of the process entity E1 a request not to be preempted.

3. The method of claim 1 wherein checking if the computer process entity E1 has been requested to surrender the processor comprises reading a memory location in an address space of the process entity E1, the memory location containing a value indicating whether the computer process entity E1 has been requested to surrender the processor.

4. A method for operating a computer, the method comprising:
   checking if a request has been issued not to preempt a schedulable computer process entity E1, wherein preemption of a schedulable process entity comprises preventing the entity from running even though the entity is able to run and is not voluntarily surrendering a computer processor;
   if a request has been issued not to preempt the process entity E1, then performing the steps of:
      1) requesting the process entity E1 to voluntarily surrender a processor; and
      2) scheduling the process entity E1 to run without being preempted.

5. The method of claim 4 wherein checking if a request has been issued not to preempt the process entity E1 comprises reading a memory location in an address space of the scheduling program, the memory location containing a value indicating whether a request has been issued not to preempt the process entity E1.

6. The method of claim 4 wherein requesting the process entity E1 to surrender the processor comprises writing to a memory location within an address space of the scheduling program a request that the process entity E1 surrender the processor.

7. The method of claim 4 wherein the steps 1) and 2) are performed only if the process entity E1 is to be preempted but for the request not to preempt the process entity.

8. A method for operating a computer, the method comprising:
   checking if a request has been issued not to preempt a schedulable computer process entity;
   if a request has been issued not to preempt the process entity, then performing the steps of:
      1) requesting the process entity to surrender a processor; and
      2) scheduling the process entity to run without being preempted,
   wherein the steps 1) and 2) are performed if the process entity has run less than an interval of time after the process entity was to be preempted but for the request not to preempt the process entity, and
   the method further comprises preempting the process entity if the process entity has run more than the predetermined amount of time after the process entity was to be preempted but for the request not to preempt the process entity.

9. The method of claim 8 wherein the interval of time is a fixed interval.

10. A computer readable medium comprising one or more computer instructions to be executed as a schedulable computer process entity E1, the one or more instructions comprising instructions for:
    the schedulable computer process entity E1 requesting not to be preempted by a scheduling operation when the scheduling operation schedules computer process entities to run, wherein preemption of a schedulable process entity comprises preventing the process entity from running even though the entity is able to run and is not voluntarily surrendering a computer processor;
    the computer process entity E1 continuing to run after requesting not to be preempted;
    the computer process entity E1 checking if the computer process entity E1 has been requested to surrender a processor, and if the computer process entity E1 has been requested to surrender the processor then the computer process entity E1 voluntarily surrendering the processor.

11. The computer readable medium of claim 10 wherein requesting not to be preempted comprises writing to a memory location in an address space of the process entity E1 a request not to be preempted.

12. The computer readable medium of claim 10 wherein checking if the computer process entity E1 has been requested to surrender the processor comprises reading a memory location in an address space of the process entity E1, the memory location containing a value indicating whether the computer process entity E1 has been requested to surrender the processor.

13. A system comprising the computer readable medium of claim 10 and a processor for executing the one or more instructions.

14. A method for providing a computer readable medium comprising one or more computer instructions to be executed as a schedulable computer process entity E1, the method comprising:
    providing, on the medium, one or more instructions for the schedulable computer process entity E1 requesting not to be preempted by a scheduling operation when the scheduling operation schedules computer process entities to run, wherein preemption of a schedulable process entity comprises preventing the process entity to run even though the entity is able to run and is not voluntarily surrendering a computer processor, and the computer process entity acquiring a shared resource;
    providing, on the medium, one or more instructions for the computer process entity E1 releasing the shared resource;
    providing, on the medium, one or more instructions for the computer process entity E1 checking if the computer process entity E1 has been requested to surrender a processor, and if the computer process entity E1 has been requested to surrender the processor then the computer process entity E1 voluntarily surrendering the processor after releasing the shared resource.

15. A computer readable medium comprising one or more computer instructions for:

checking if a request has been issued not to preempt a schedulable computer process entity E1, wherein preemption of a schedulable process entity comprises preventing the process entity from running even though the entity is able to run and is not voluntarily surrendering a computer processor;

if a request has been issued not to preempt the process entity E1, then performing the steps of:
  1) requesting the process entity E1 to voluntarily surrender a processor; and
  2) scheduling the process entity E1 to run without being preempted.

16. The computer readable medium of claim 15 wherein checking if a request has been issued not to preempt the process entity E1 comprises reading a memory location in an address space of the scheduling program, the memory location containing a value indicating whether a request has been issued not to preempt the process entity E1.

17. The computer readable medium of claim 15 wherein requesting the process entity E1 to surrender the processor comprises writing to a memory location within an address space of the scheduling program a request that the process entity E1 surrender the processor.

18. The computer readable medium of claim 15 wherein the steps 1) and 2) are performed only if the process entity E1 is to be preempted but for the request not to preempt the process entity E1.

19. A computer readable medium comprising one or more computer instructions for:

checking if a request has been issued not to preempt a schedulable computer process entity;

if a request has been issued not to preempt the process entity, then performing the steps of:
  1) requesting the process entity to surrender a processor; and
  2) scheduling the process entity to run without being preempted, wherein the steps 1) and 2) are performed if the process entity has run less than an interval of time after the process entity was to be preempted but for the request not to preempt the process entity, and the computer readable medium further comprises one or more instructions for preempting the process entity if the process entity has run more than the interval of time after the process entity was to be preempted but for the request not to preempt the process entity.

20. The computer readable medium of claim 19 wherein the interval of time is a fixed interval.

21. A system comprising the computer readable medium of claim 15 and a processor for executing the one or more instructions.

22. A method for providing a computer readable medium comprising one or more computer instructions, the method comprising:

providing, on the medium, one or more instructions for checking if a request has been issued not to preempt a schedulable computer process entity E1, wherein preemption of a schedulable process entity comprises preventing the process entity from running even though the entity is able to run and is not voluntarily surrendering a computer processor;

providing, on the medium, one or more instructions for performing the following steps if a request has been issued not to preempt the process entity E1:

1) requesting the process entity E1 to voluntarily surrender a processor; and
  2) scheduling the process entity E1 to run without being preempted.

23. The method of claim 1 further comprising:

the entity E1 acquiring a shared resource; and the entity E1 holding the shared resource after requesting not to be preempted;

wherein the checking if the entity E1 has been requested to surrender the processor is performed when the entity E1 has released or is about to release the shared resource; and if the entity E1 has been requested to surrender the processor, the entity E1 releasing the shared resource before surrendering the processor.

24. The method of claim 23 wherein:

the entity E1 acquires the shared resource after requesting not to be preempted; and the entity E1 releases the shared resource before checking if the entity E1 has been requested to surrender a processor, and when the entity E1 releases the shared resource the entity E1 withdraws the request not to be preempted.

25. The method of claim 24 wherein:

the entity E1 acquires a plurality of shared resources after requesting not to be preempted; and the entity E1 releases all of said shared resources before surrendering the processor.

26. The method of claim 23 wherein the scheduling operation is performed by an operating system entity which does not identify process entities holding said shared resource and entities blocking on said shared resource.

27. The method of claim 26 wherein the computer comprises one or more shared resources R1 for which the operating system entity identifies entities holding said shared resource and entities blocking on said shared resource, wherein if a schedulable entity E2 blocks on a resource R1 held by an entity E3 having a lower priority than E2, the priority of E2 is temporarily transferred to E3.

28. The method of claim 26 wherein the operating system entity is a UNIX or Solaris kernel.

29. The method of claim 23 wherein the resource can be held by at most one schedulable computer process entity at any given time.

30. The method of claim 23 further comprising the entity E1 waiting in a busy loop for the shared resource to be released before the entity E1 can acquire the resource, wherein the busy loop is performed after the entity E1 has requested not to be preempted.

31. The method of claim 23 wherein the resource comprises a DBMS latch.

32. The method of claim 1 wherein the request not to be preempted does not identify a reason for the entity E1 issuing the request.

33. The method of claim 1 further comprising:

an operating system entity performing the scheduling operation and determining in the scheduling operation that the entity E1 is to be preempted but for the request not to be preempted;

the operating system entity requesting the entity E1 to voluntarily surrender a processor; and the operating system entity scheduling the process entity E1 to run without being preempted.

34. The method of claim 2 wherein two or more schedulable computer process entities use respective different memory locations for their respective requests not to be preempted.

35. The method of claim 4 wherein said checking and the steps 1) and 2) are performed on an interrupt caused by a clock tick of a clock.

36. The method of claim 35 wherein a request not to preempt a schedulable entity is operable to block preemption of the entity on interrupts caused by clock ticks, but is not operable to block preemption of the entity on any interrupts not caused by clock ticks.

37. The method of claim 4 wherein a schedulable process entity is preempted if it ran without being preempted for at least a selected period of time and did not request not to be preempted.

38. The method of claim 5 further comprising allocating said memory location, and an operating system scheduling entity maintaining a flag indicating that the memory location has been allocated, the flag being not in the address space of the entity E1.

39. The method of claim 4 wherein:
the computer is operable to execute process entities of a first type and process entities of a second type, wherein any entity of the second type has a higher priority than any entity of the first type, and wherein the entity E1 is of the first type; and
the request not to preempt the entity E1 is operable to block preemption of the entity E1 by another entity of the first type but not by any entity of the second type, so that step 2) is performed if the entity E1 is to be preempted by another entity of the first type but step 2) is not performed if the entity E1 is to be preempted by an entity of the second type.

40. The method of claim 39 wherein the second type includes an operating system thread.

41. The method of claim 39 wherein step 1) is performed only if the entity E1 is to be preempted by an entity of the first type.

42. The method of claim 39 further comprising the entity E1 getting the highest possible priority for entities of the first type if the entity E1 is preempted by an entity of the second type despite the request not to be preempted.

43. The method of claim 4 further comprising withdrawing the request to surrender a processor when the entity E1 surrenders a processor.

44. The method of claim 4 further comprising lowering a priority of the entity E1 when the entity E1 surrenders a processor if steps 1) and 2) were performed for the entity.

45. The method of claim 4 wherein the computer comprises at least a first processor and a second processor, and the method further comprises:
when the entity E1 runs on the second processor, the first processor deciding that the entity E1 should be preempted;
the first processor sending an interrupt to the second processor; and
the second processor checking if the request not to preempt has been issued, and the second processor performing the steps 1) and 2) if the request has been issued.

46. The computer readable medium of claim 10 further comprising one or more instructions for:
the entity E1 acquiring a shared resource; and
the entity E1 holding the shared resource after requesting not to be preempted;
wherein the checking if the entity E1 has been requested to surrender the processor is performed when the entity E1 has released or is about to release the shared resource; and
if the entity E1 has been requested to surrender the processor, the entity E1 releasing the shared resource before surrendering the processor.

47. The computer readable medium of claim 46 wherein:
the entity E1 acquires the shared resource after requesting not to be preempted; and
the entity E1 releases the shared resource before checking if the entity E1 has been requested to surrender a processor, and when the entity E1 releases the shared resource the entity E1 withdraws the request not to be preempted.

48. The computer readable medium of claim 47 wherein:
the entity E1 acquires a plurality of shared resources after requesting not to be preempted; and
the entity E1 releases all of said shared resources before surrendering the processor.

49. The computer readable medium of claim 46 wherein the scheduling operation is performed by an operating system entity which does not identify process entities holding said shared resource and entities blocking on said shared resource.

50. The computer readable medium of claim 49 wherein the computer comprises one or more shared resources R1 for which the operating system entity identifies entities holding said shared resource and entities blocking on said shared resource, wherein if a schedulable entity E2 blocks on a resource R1 held by an entity E3 having a lower priority than E2, the priority of E2 is temporarily transferred to E3.

51. The computer readable medium of claim 49 wherein the operating system entity is a UNIX or Solaris kernel.

52. The computer readable medium of claim 46 wherein the resource can be held by at most one schedulable computer process entity at any given time.

53. The computer readable medium of claim 46 further comprising one or more instructions for the entity E1 waiting in a busy loop for the shared resource to be released before the entity E1 can acquire the resource,
wherein the busy loop is performed after the entity E1 has requested not to be preempted.

54. The computer readable medium of claim 46 wherein the resource comprises a DBMS latch.

55. The computer readable medium of claim 10 wherein the request not to be preempted does not identify a reason for the entity E1 issuing the request.

56. The computer readable medium of claim 10 further comprising one or more instructions for:
an operating system entity performing the scheduling operation and determining in the scheduling operation that the entity E1 is to be preempted but for the request not to be preempted;
the operating system entity requesting the entity E1 to voluntarily surrender a processor; and
the operating system entity scheduling the process entity E1 to run without being preempted.

57. The computer readable medium of claim 11 wherein two or more schedulable computer process entities use respective different memory locations for their respective requests not to be preempted.

58. The computer readable medium of claim 15 wherein said checking and the steps 1) and 2) are performed on an interrupt caused by a clock tick of a clock.

59. The computer readable medium of claim 58 wherein a request not to preempt a schedulable entity is operable to block preemption of the entity on interrupts caused by clock ticks, but is not operable to block preemption of the entity on any interrupts not caused by clock ticks.

60. The computer readable medium of claim 15 wherein a schedulable process entity is preempted if it ran without being preempted for at least a selected period of time and did not request not to be preempted.

61. The computer readable medium of claim 16 further comprising one or more instructions for allocating said memory location, and for an operating system scheduling entity maintaining a flag indicating that the memory location has been allocated, the flag being not in the address space of the entity E1.

62. The computer readable medium of claim 15 wherein:
  the computer is operable to execute process entities of a first type and process entities of a second type, wherein any entity of the second type has a higher priority than any entity of the first type, and wherein the entity E1 is of the first type; and
  the request not to preempt the entity E1 is operable to block preemption of the entity E1 by another entity of the first type but not by any entity of the second type, so that step 2) is performed if the entity E1 is to be preempted by another entity of the first type but step 2) is not performed if the entity E1 is to be preempted by an entity of the second type.

63. The computer readable medium of claim 62 wherein the second type includes an operating system thread.

64. The computer readable medium of claim 62 wherein step 1) is performed only if the entity E1 is to be preempted by an entity of the first type.

65. The computer readable medium of claim 62 further comprising one or more instructions for the entity E1 getting the highest possible priority for entities of the first type if the entity E1 is preempted by an entity of the second type despite the request not to be preempted.

66. The computer readable medium of claim 15 further comprising one or more instructions for withdrawing the request to surrender a processor when the entity E1 surrenders a processor.

67. The computer readable medium of claim 15 further comprising one or more instructions for lowering a priority of the entity E1 when the entity E1 surrenders a processor if steps 1) and 2) were performed for the entity.

68. The computer readable medium of claim 15 wherein the computer comprises at least a first processor and a second processor, and the computer readable medium further comprises one or more instructions for:
  when the entity E1 runs on the second processor, the first processor deciding that the entity E1 should be preempted;
  the first processor sending an interrupt to the second processor; and
  the second processor checking if the request not to preempt has been issued, and the second processor performing the steps 1) and 2) if the request has been issued.

* * * * *